United States Patent [19]
Alicea

[11] Patent Number: 5,724,838
[45] Date of Patent: Mar. 10, 1998

[54] ANTI-THEFT DEVICE FOR A MOTOR VEHICLE

[76] Inventor: David Alicea, 23-21 93rd St., East Elmhurst, N.Y. 11369

[21] Appl. No.: 818,295

[22] Filed: Mar. 14, 1997

[51] Int. Cl.$^6$ .................................................. B60R 25/02
[52] U.S. Cl. .................... 70/18; 70/199; 70/209; 70/211; 70/238; 70/247; 70/455
[58] Field of Search ........................ 70/18, 19, 417, 70/423–428, 455, 209, 211, 212, 225, 226, 227, 237–239, 198–203, 245–248; 224/935; 180/287

[56] References Cited

U.S. PATENT DOCUMENTS

| | | | |
|---|---|---|---|
| 1,228,123 | 5/1917 | McDermott | 70/212 |
| 1,531,062 | 3/1925 | Barravecchia | 70/202 |
| 4,104,895 | 8/1978 | Tankel | 70/237 |
| 4,696,173 | 9/1987 | Lee | 70/427 |
| 4,848,110 | 7/1989 | Kuo | 70/238 X |
| 5,119,651 | 6/1992 | Yang | 70/52 |
| 5,129,603 | 7/1992 | Wippler | 70/238 X |
| 5,212,970 | 5/1993 | Harrell | 70/424 X |
| 5,329,793 | 7/1994 | Chen | 70/209 |
| 5,431,033 | 7/1995 | Barrett | 70/209 |
| 5,473,918 | 12/1995 | Hixon | 70/202 |
| 5,566,560 | 10/1996 | LiCausi | 70/237 X |
| 5,653,133 | 8/1997 | Passantino | 70/238 |

*Primary Examiner*—Lloyd A. Gall
*Attorney, Agent, or Firm*—Michael I. Kroll

[57] ABSTRACT

An anti-theft device (10) for a motor vehicle (12) comprising a clamp (14) mounted in a releasable manner to a steering wheel (16) of the motor vehicle (12), to prevent rotation of the steering wheel (16). A bracket (18) pivotally extends from the clamp (14) and is connected in a releasable manner to a brake pedal (20) of the motor vehicle (12), to prevent operation of the brake pedal (20). A cover (22) is coupled to the clamp (14) and is affixed in a releasable manner about a steering column (24) of the motor vehicle (12), to prevent access to an ignition switch (26) in the steering column (24) and to prevent movement of a gearshift lever (28) on the steering column (24).

25 Claims, 3 Drawing Sheets

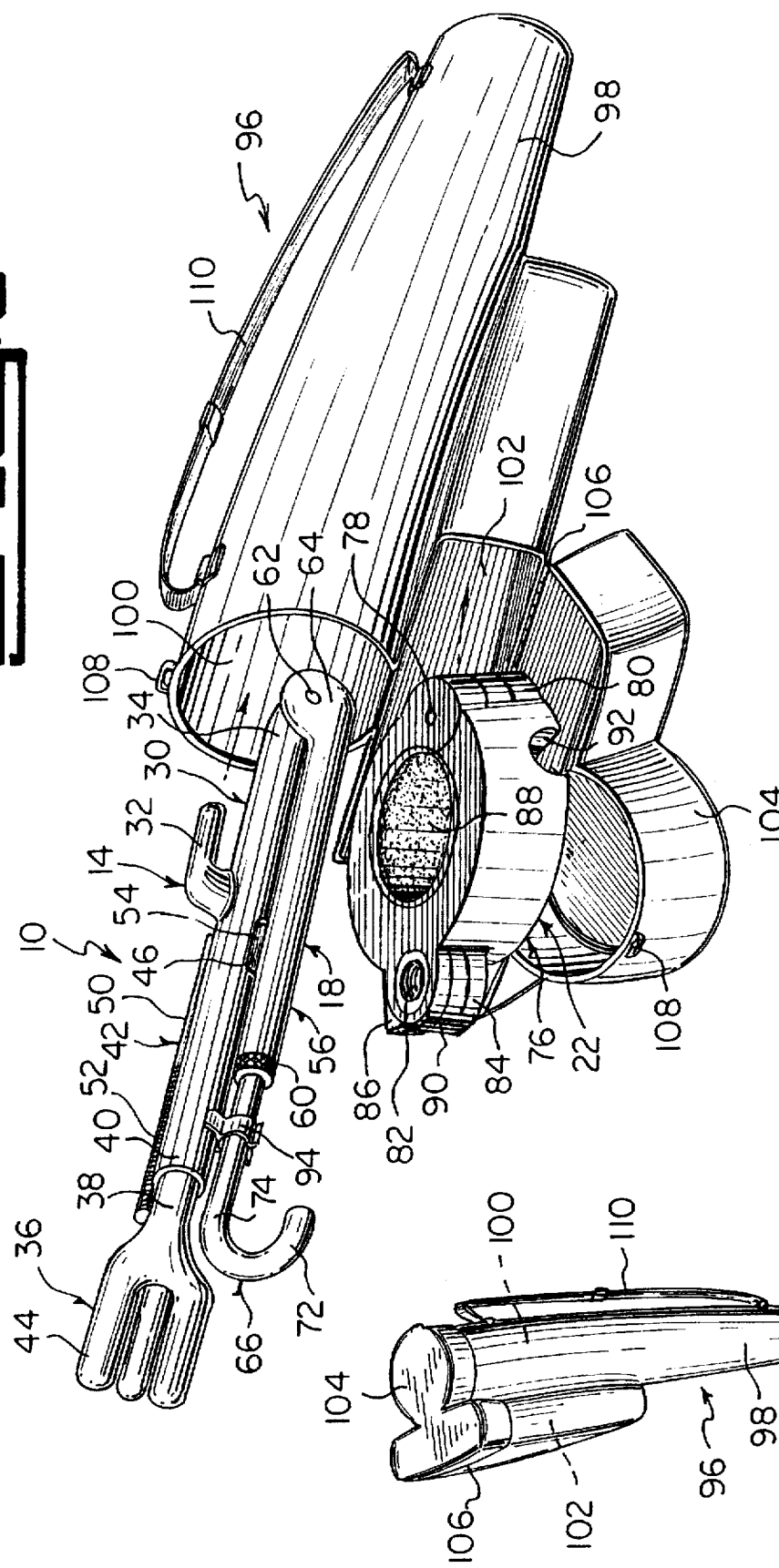

ANTI-THEFT DEVICE FOR A MOTOR VEHICLE

BACKGROUND OF THE INVENTION

1. Field of the Invention

The instant invention relates generally to automotive locking devices and more specifically it relates to an anti-theft device for a motor vehicle. The anti-theft device for a motor vehicle will engage with the steering wheel, the ignition switch, the brake pedal and the gearshift lever, to prevent theft of the motor vehicle.

2. Description of the Prior Art

Numerous automotive locking devices have been provided in prior art. For example, U.S. Pat. Nos. 5,119,651 to Yang; 5,329,793 to Chen; 5,431,033 to Barrett and 5,473,918 to Hixon all are illustrative of such prior art. While these units may be suitable for the particular purpose to which they address, they would not be as suitable for the purposes of the present invention as heretofore described.

YANG, WEN-HSIEN

STEERING LOCK WITH IGNITION SWITCH BLOCKING MEANS

U.S. Pat. No. 5,119,651

A steering lock with a lock body having an attached extensible member for adjusting the distance between two locking rods which are connected in parallel through a telescopic tube to form a shackle. The shackle can be extended when clearance is required, and is coupled with a pair of hook-shaped fastening rods which are connected in parallel through another telescopic tube for fastening to the steering wheel. When a lock barrel of the lock body is rotated to a locking position, the first and second latches inside the lock body lock up the locking bars and the extensible member. Two protective cover boards are bilaterally attached to the lock body to prevent insertion of a tool to cut the second latch and prevent injury to fingers during the locking and unlocking operation.

CHEN, KUN-CHAO

ANTI-THEFT DEVICE FOR A VEHICLE

U.S. Pat. No. 5,329,793

An anti-theft device for a vehicle includes a casing engaged in a housing. A sleeve extends upward from the housing for receiving a lock. A rod has one end rotatably coupled to the casing and the other end slidably engaged in a tube. A ring element is pivotally coupled to the tube. A shank is engaged through the housing and the casing, so as to form the anti-theft device. The device has a simplified configuration and has a greatly lowered manufacturing cost.

BARRETT, JOSEPH S.

STEERING WHEEL AND IGNITION LOCKING DEVICE FOR A VEHICLE

U.S. Pat. No. 5,431,033

An anti-theft device for a vehicle that includes a combination of a steering wheel lock and an ignition cover to prevent access to the ignition and to prevent use of the steering wheel or access to the steering wheel center hub when the device is in place. The purpose of the device is to prevent the theft of an automobile or truck utilizing the device.

HIXON, FRANK E.

LOCKING DEVICE FOR GEARSHIFT

U.S. Pat. No. 5,473,918

A locking device for the gearshift lever of a large truck. The gearshift lever is of the type which extends vertically upwardly through an opening in the floorboard of the truck. The locking device comprises a sleeve surrounding and firmly engaging a lower portion of the gearshift lever. The sleeve is provided with a vertical bore. A vertical locking rod is slideably mounted in the vertical bore. The locking rod has a lower end which projects below the floorboard when the rod is in its lowermost position. A horizontal locking plate is attached below the floorboard and has a portion extending into the opening. The locking plate has a locking hole therethrough for receiving the lower end of the lock rod, when the latter is in its lowermost position. A rotatable lock is mounted on the sleeve and has a rotatable shaft therein. The locking rod is provided with a notch adjacent the upper end thereof. The lock shaft is provided with a semi-circular extension which is received in the notch when the rod is in its lowermost position.

SUMMARY OF THE INVENTION

A primary object of the present invention is to provide an anti-theft device for a motor vehicle that will overcome the shortcomings of the prior art devices.

Another object is to provide an anti-theft device for a motor vehicle that will help prevent the theft of the motor vehicle by protecting the steering wheel, the ignition switch, the brake pedal and the gearshift lever, so that the motor vehicle can not be operated by a thief.

An additional object is to provide an anti-theft device for a motor vehicle that is a multi-protection tool having one lock mechanism to maintain it in place, to prevent the theft of the motor vehicle.

A further object is to provide an anti-theft device for a motor vehicle that is simple and easy to use.

A still further object is to provide an anti-theft device for a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1a is a partly exploded perspective view of the instant invention per se, with some parts broken away and in section.

FIG. 2 is a perspective view showing the instant invention folded up ready to be inserted into an opened storage carrying case.

FIG. 3 is a perspective view of the storage carrying case closed.

Similar reference characters denote corresponding features consistently throughout the attached drawings.

DETAILED DESCRIPTION OF THE PREFERRED EMBODIMENTS

Figure 1:
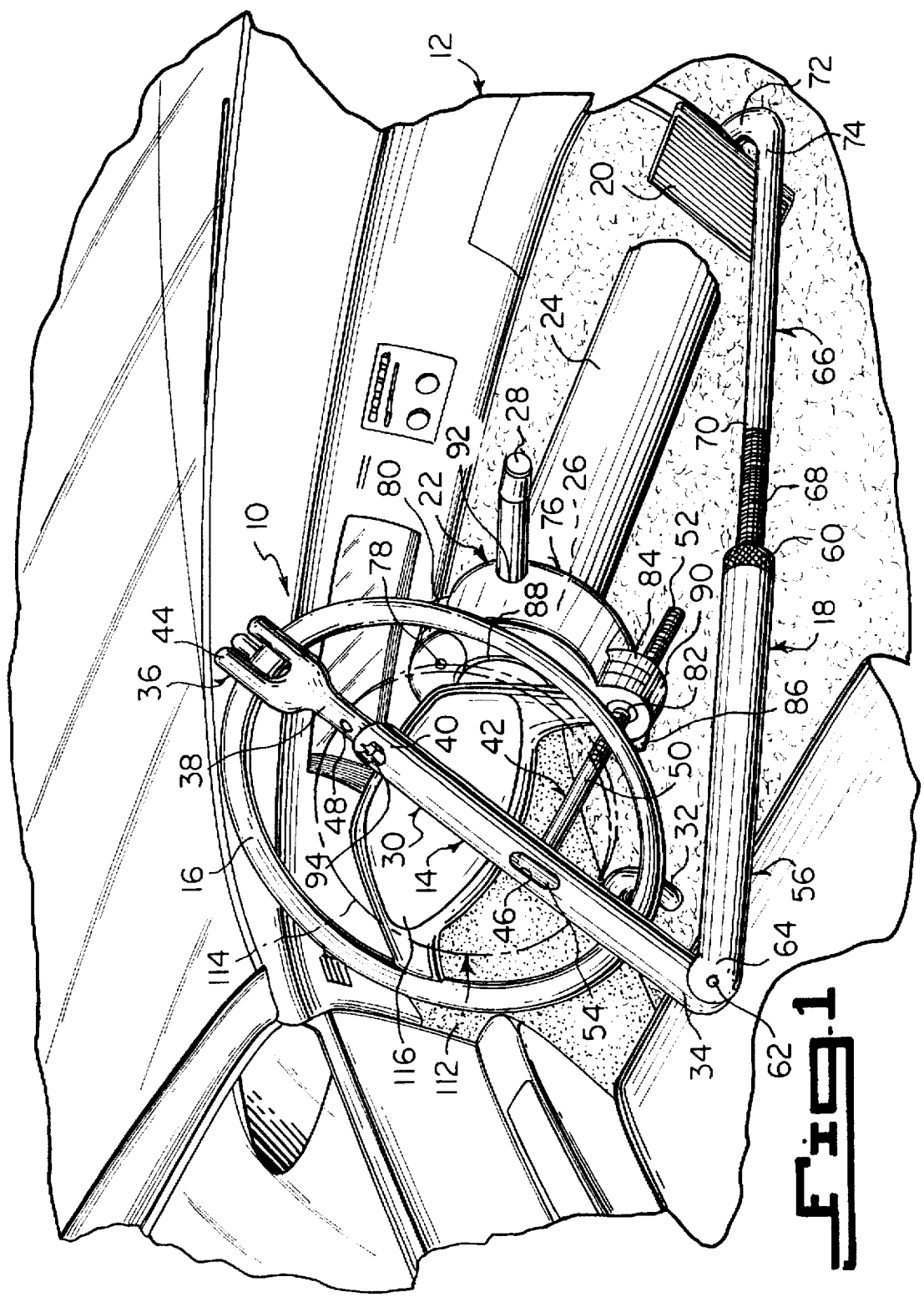
FIG. 1 is a perspective view showing the instant invention installed in place within the motor vehicle.
Figure 10:
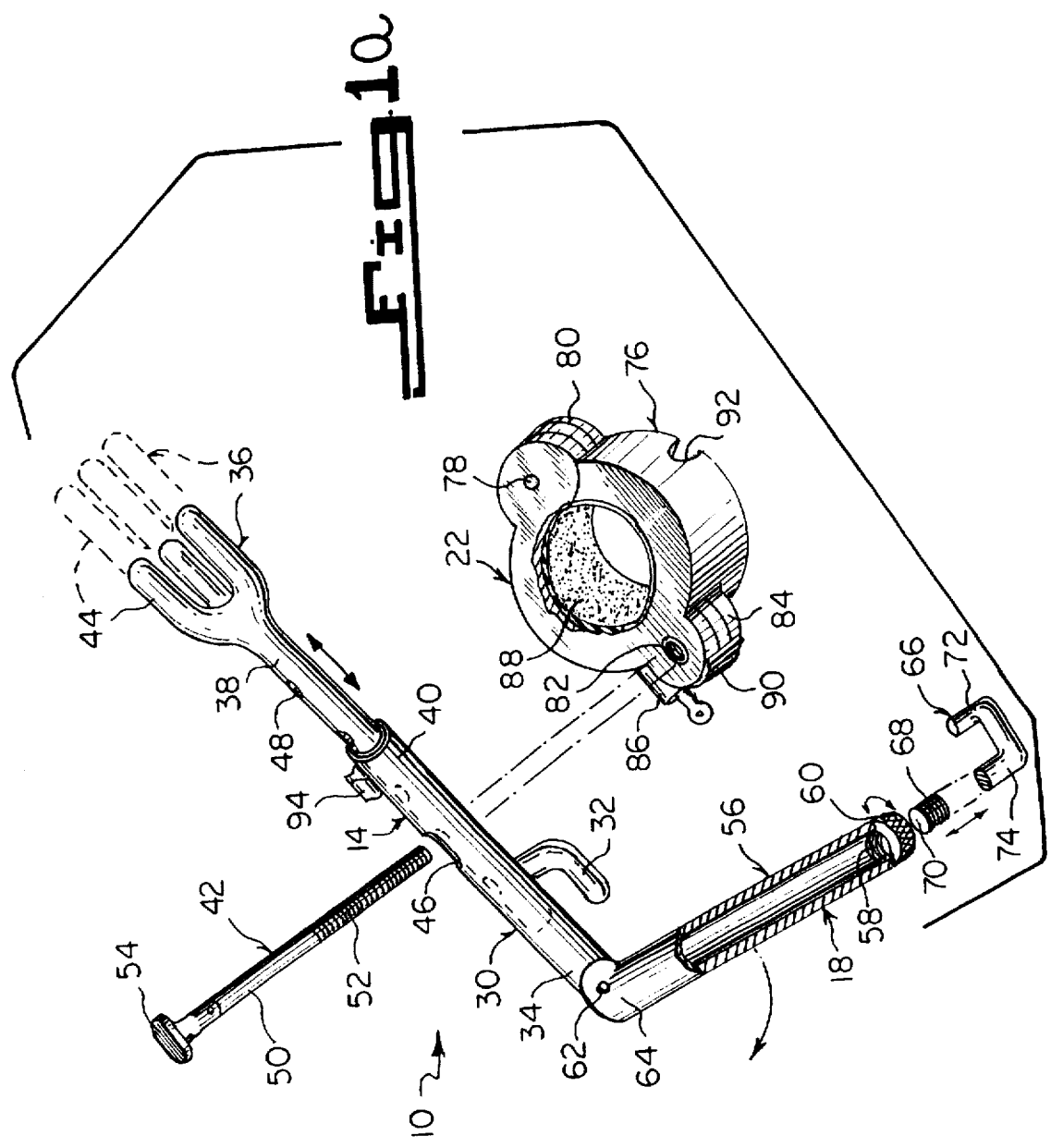

Turning now descriptively to the drawings, in which similar reference characters denote similar elements throughout the several views, FIGS. 1, 1a and 2 illustrate an anti-theft device 10 for a motor vehicle 12 comprising a clamp 14 mounted in a releasable manner to a steering wheel 16 of the motor vehicle 12, to prevent rotation of the steering wheel 16. A bracket 18 pivotally extends from the clamp 14 and is connected in a releasable manner to a brake pedal 20 of the motor vehicle 12, to prevent operation of the brake pedal 20. A cover 22 is coupled to the clamp 14 and is affixed in a releasable manner about a steering column 24 of the motor vehicle 12, to prevent access to an ignition switch 26 in the steering column 24, and to prevent movement of a gearshift lever 28 on the steering column 24.

The clamp 14 consists of a hollow arm 30 having a hook 32 adjacent a first end 34 to engage with the steering wheel 16. An adjustable fork member 36 has a shaft 38 extending from a second end 40 of the hollow arm 30. A structure 42 is for retaining the shaft 38 of the adjustable fork member 36 in an extended position from the second end 40 of the hollow arm 30, so that the adjustable fork member 36 will engage with the steering wheel 16 opposite from the hook 32. The adjustable fork member 36 includes a three tined end 44 extending from the shaft 38, to better engage with the steering wheel 16 of the motor vehicle 12.

The retaining structure 42 comprises the hollow arm 30 having a recessed aperture 46 therethrough. The adjustable fork member 36 has a plurality of spaced apart transverse holes 48 in the shaft 38. An elongated bolt 50 has a threaded shank 52 and pivot head 54 to fit into the recessed aperture 46 in the hollow arm 30, and through one of the transverse holes 48 in the shaft 38 of the adjustable fork member 36.

The bracket 18 consists of a hollow tube 56 having internal threads 58 in the first end 60. A pivot pin 62 is through a second end 64 of the hollow tube 56 and into one end of the clamp 14. An adjustable rod 66 has external threads 68 on a first end 70, to engage with the internal threads 58 in the first end 60 of the hollow tube 56. A hook 72 is on a second end 74, to engage with the brake pedal 20.

The cover 22 includes a split collar 76 having a hinge 78 at a first end 80 and a threaded meshing aperture 82 at a second end 84, to receive the threaded shank 52 of the elongated bolt 50. A key operated locking mechanism 86 keeps the split collar 76 closed on the steering column 24.

The cover 22 further includes a split foam rubber padded ring 88 on an inner circumference of the split collar 76, to prevent damage to the steering column 24 when the split collar 76 is closed on the steering column 24. The key operated locking mechanism 86 contains a hinged latch 90 to hold the split collar 76 closed, while the key operated locking mechanism 86 is activated.

The split collar 76 has a semi-circular notch 92 located on a bottom edge thereof, to engage with the gearshift lever 28 on the steering column 24. A spring clip 94 is on the clamp 14, so that when the bracket 18 is pivoted into a folded state, the spring clip 94 will engage with the adjustable rod 66, as shown in FIG. 3.

FIGS. 2 and 3 show a storage carrying case 96, to hold the anti-theft device 10 therein when not in use. The storage carrying case 96 includes a dual compartment base 98 for holding in the first compartment 100 the clamp 14 and the bracket 18 in a folded state. The second compartment 102 holds the cover 22 when separated from the bracket 18. A dual compartment lid 104 is hinged at 106 to the dual compartment base 98. A latch 108 keeps the dual compartment lid 104 closed over the dual compartment base 98. A carry handle 110 is mounted on a side of the dual compartment base 98.

The anti-theft device 10 can further contain an air bag protector 112, shown in phantom in FIG. 1, being a large disc 114 affixed to the hollow arm 30 of the clamp 14. When the clamp 14 is mounted in the releasable manner to the steering wheel 16, theft of an air bag 116 within the steering wheel 16 will be prevented by the large disc 114.

LIST OF REFERENCE NUMBERS 10 anti-theft device
12 motor vehicle
14 clamp of 10
16 steering wheel of 12
18 bracket of 10
20 brake pedal of 12
22 cover of 10
24 steering column of 12
26 ignition switch in 24
28 gearshift lever on 24
30 hollow arm of 14
32 hook on 30
34 first end of 30
36 adjustable fork member of 14
38 shaft of 36
40 second end of 30
42 retaining structure of 14
44 three tined end of 36
46 recessed aperture in 30
48 transverse hole in 38
50 elongated bolt
52 threaded shank of 50
54 pivot head of 50
56 hollow tube of 18
58 internal threads in 60
60 first end of 56
62 pivot pin of 18
64 second end of 56
66 adjustable rod of 18
68 external threads on 70
70 first end of 66
72 hook on 74
74 second end of 66
76 split collar of 22
78 hinge at 80
80 first end of 76
82 threaded meshing aperture at 84
84 second end of 76
86 key operated locking mechanism of 22
88 split foam rubber padded ring of 22
90 hinged latch of 86
92 semi-circular notch on 76
94 spring clip on 14
96 storage carrying case for 10

98 dual compartment base of 96
100 first compartment of 98 for 14 and 18
102 second compartment of 98 for 22
104 dual compartment lid of 96
106 hinge between 98 and 104
108 latch between 98 and 104
110 carry handle on 98
112 air bag protector
114 large disc for 112 on 30
116 air bag in 16

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An anti-theft device for a motor vehicle comprising:
   a) a clamp adapted to be mounted in a releasable manner to a steering wheel of the motor vehicle, to prevent rotation of the steering wheel;
   b) a bracket pivotally extending from said clamp and adapted to be connected in a releasable manner to a brake pedal of the motor vehicle, to prevent operation of the brake pedal; and
   c) a cover coupled to said clamp and adapted to be affixed in a releasable manner about a steering column of the motor vehicle, to prevent access to an ignition switch in the steering column and to prevent movement of a gearshift lever on the steering column.

2. An anti-theft device for a motor vehicle as recited in claim 1, wherein said clamp includes:
   a) a hollow arm having a hook adjacent a first end to engage with the steering wheel;
   b) an adjustable fork member having a shaft extending from a second end of said hollow arm; and
   c) means for retaining said shaft of said adjustable fork member in an extended position from said second end of said hollow arm, so that said adjustable fork member will engage with the steering wheel opposite from said hook.

3. An anti-theft device for a motor vehicle as recited in claim 2, wherein said adjustable fork member includes a three tined end extending from said shaft to better engage with the steering wheel of the motor vehicle.

4. An anti-theft device for a motor vehicle as recited in claim 2, wherein said retaining means includes:
   a) said hollow arm having a recessed aperture therethrough;
   b) said adjustable fork member having a plurality of spaced apart transverse holes in said shaft; and
   c) an elongated bolt having a threaded shank and pivot head to fit into said recessed aperture in said hollow arm, and through one of said transverse holes in said shaft of said adjustable fork member.

5. An anti-theft device for a motor vehicle as recited in claim 1, wherein said bracket includes:
   a) a hollow tube having internal threads in a first end;
   b) a pivot pin through a second end of said hollow tube and into one end of said clamp; and
   c) an adjustable rod having external threads on a first end to engage with said internal threads in said first end of said hollow tube, and a hook on a second end to engage with the brake pedal.

6. An anti-theft device for a motor vehicle as recited in claim 4, wherein said cover includes:
   a) a split collar having a hinge at a first end and a threaded meshing aperture at a second end, to receive said threaded shank of said elongated bolt; and
   b) a key operated locking mechanism to keep said split collar closed on the steering column.

7. An anti-theft device for a motor vehicle as recited in claim 6, wherein said cover further includes a split foam rubber padded ring on an inner circumference of said split collar, to prevent damage to the steering column when said split collar is closed on the steering column.

8. An anti-theft device for a motor vehicle as recited in claim 6, wherein said key operated locking mechanism includes a hinged latch to hold said split collar closed while said key operated locking mechanism is activated.

9. An anti-theft device for a motor vehicle as recited in claim 6, wherein said split collar having a semi-circular notch located on a bottom edge thereof, to engage with the gearshift lever on the steering column.

10. An anti-theft device for a motor vehicle as recited in claim 5, further including a spring clip on said clamp, so that when said bracket is pivoted into a folded state, said spring clip will engage with said adjustable rod.

11. An anti-theft device for a motor vehicle as recited in claim 1, further including a storage carrying case, to hold said anti-theft device therein when not in use.

12. An anti-theft device for a motor vehicle as recited in claim 11, wherein said storage carrying case includes:
   a) a dual compartment base for holding in a first compartment said clamp and said bracket in a folded state and in a second compartment said cover when separated from said clamp;
   b) a dual compartment lid hinged to said dual compartment base;
   c) a latch, to keep said dual compartment lid closed over said dual compartment base; and
   d) a carry handle mounted on a side of said dual compartment base.

13. An anti-theft device for a motor vehicle as recited in claim 2, further including an air bag protector being a large disc affixed to said hollow arm of said clamp, so that when said clamp is mounted in the releasable manner to the steering wheel, theft of an air bag within the steering wheel will be prevented by said large disc.

14. An anti-theft device for a motor vehicle comprising:
   a) a clamp adapted to be mounted in a releasable manner to a steering wheel of the motor vehicle, to prevent rotation of the steering wheel, wherein said clamp includes a hollow arm having a hook adjacent a first end to engage with the steering wheel, an adjustable fork member having a shaft extending from a second end of said hollow arm and means for retaining said shaft of said adjustable fork member in an extended position from said second end of said hollow arm, so that said adjustable fork member will engage with the steering wheel opposite from said hook;

b) a bracket pivotally extending from said clamp and adapted to be connected in a releasable manner to a brake pedal of the motor vehicle, to prevent operation of the brake pedal; and c) a cover coupled to said clamp and adapted to be affixed in a releasable manner about a steering column of the motor vehicle, to prevent access to an ignition switch in the steering column and to prevent movement of a gearshift lever on the steering column.

15. An anti-theft device for a motor vehicle as recited in claim 14, wherein said adjustable fork member includes a three fined end extending from said shaft to better engage with the steering wheel of the motor vehicle.

16. An anti-theft device for a motor vehicle as recited in claim 15, wherein said retaining means includes:

a) said hollow arm having a recessed aperture therethrough;

b) said adjustable fork member having a plurality of spaced apart transverse holes in said shaft; and c) an elongated bolt having a threaded shank and pivot head to fit into said recessed aperture in said hollow arm, and through one of said transverse holes in said shaft of said adjustable fork member.

17. An anti-theft device for a motor vehicle as recited in claim 16, wherein said bracket includes:

a) a hollow tube having internal threads in a first end;

b) a pivot pin through a second end of said hollow tube and into one end of said clamp; and c) an adjustable rod having external threads on a first end to engage with said internal threads in said first end of said hollow tube, and a hook on a second end to engage with the brake pedal.

18. An anti-theft device for a motor vehicle as recited in claim 17, wherein said cover includes:

a) a split collar having a hinge at a first end and a threaded meshing aperture at a second end, to receive said threaded shank of said elongated bolt; and b) a key operated locking mechanism to keep said split collar closed on the steering column.

19. An anti-theft device for a motor vehicle as recited in claim 18, wherein said split cover further includes a split foam rubber padded ring on an inner circumference of said split collar, to prevent damage to the steering column when said split collar is closed on the steering column.

20. An anti-theft device for a motor vehicle as recited in claim 19, wherein said key operated locking mechanism includes a hinged latch to hold said split collar closed while said key operated locking mechanism is activated.

21. An anti-theft device for a motor vehicle as recited in claim 20, wherein said split collar having a semi-circular notch located on a bottom edge thereof, to engage with the gearshift lever on the steering column.

22. An anti-theft device for a motor vehicle as recited in claim 21, further including a spring clip on said clamp, so that when said bracket is pivoted into a folded state, said spring clip will engage with said adjustable rod.

23. An anti-theft device for a motor vehicle as recited in claim 22, further including a storage carrying case, to hold said anti-theft device therein when not in use.

24. An anti-theft device for a motor vehicle as recited in claim 23, wherein said storage carrying case includes:

a) a dual compartment base for holding in a first compartment said clamp and said bracket in a folded state and in a second compartment said cover when separated from said clamp;

b) a dual compartment lid hinged to said dual compartment base;

c) a latch, to keep said dual compartment lid closed over said dual compartment base; and d) a carry handle mounted on a side of said dual compartment base.

25. An anti-theft device for a motor vehicle as recited in claim 24, further including an air bag protector being a large disc affixed to said hollow arm of said clamp, so that when said clamp is mounted in the releasable manner to the steering wheel, theft of an air bag within the steering wheel will be prevented by said large disc.

* * * * *